United States Patent [19]

Hu et al.

[11] Patent Number: 5,574,912

[45] Date of Patent: Nov. 12, 1996

[54] LATTICE SCHEDULER METHOD FOR REDUCING THE IMPACT OF COVERT-CHANNEL COUNTERMEASURES

[75] Inventors: Wei-Ming Hu, Arlington, Mass.; Andrew H. Mason, Hollis, N.H.

[73] Assignee: Digital Equipment Corporation, Maynard, Mass.

[21] Appl. No.: 519,238

[22] Filed: May 4, 1990

[51] Int. Cl.$^6$ ............................ G06F 12/14; G06F 17/30
[52] U.S. Cl. .................. 395/650; 395/700; 395/186; 395/600; 364/DIG. 1; 364/222.5; 364/246.6; 364/267.9; 364/280; 364/281.6; 364/282.1; 364/282.2; 364/286.4; 364/286.5
[58] Field of Search ........................... 395/650, 600, 395/700, 186, 187.1, 726, 728

[56] References Cited

U.S. PATENT DOCUMENTS

| | | | |
|---|---|---|---|
| 4,104,721 | 8/1978 | Markstein et al. | 395/375 |
| 4,135,240 | 1/1979 | Ritchie | 395/491 |
| 4,177,510 | 12/1979 | Appell et al. | 395/490 |
| 4,184,200 | 1/1980 | Wagner et al. | 395/186 |
| 4,262,331 | 4/1981 | Freeland et al. | 395/304 |
| 4,328,542 | 5/1982 | Anastas et al. | 395/775 |
| 4,525,780 | 6/1985 | Bratt et al. | 395/490 |
| 4,584,639 | 4/1986 | Hardy | 395/650 |
| 4,621,321 | 11/1986 | Boebert et al. | 395/600 |
| 4,695,943 | 9/1987 | Keeley et al. | 395/467 |
| 4,701,840 | 10/1987 | Boebert et al. | 395/800 |
| 4,713,753 | 12/1987 | Boebert et al. | 395/800 |
| 4,722,043 | 1/1988 | Nagamine et al. | 395/147 |
| 4,858,117 | 8/1989 | DiChiara et al. | 395/418 |
| 4,890,227 | 12/1989 | Watanabe et al. | 395/800 |
| 5,062,035 | 10/1991 | Tanimoto et al. | 395/550 |

FOREIGN PATENT DOCUMENTS 0 407 060 A2  1/1991  European Pat. Off. ........ G06F 12/14

OTHER PUBLICATIONS

Peterson, J. L. et al., Operating System Concepts 2/e Addison–Wesley, pp. 122–125, 1985.

Primary Examiner—Wayne Amsbury
Assistant Examiner—Peter Y. Wang
Attorney, Agent, or Firm—Arnold, White & Durkee

[57] ABSTRACT

A method for scheduling processes for execution in a computer system organizes the processes into run queues in accordance with the respective secrecy classes of the processes. A CPU time slot is assigned to each run queue. If all processes in a run queue give up the CPU before the expiration of the run queue's assigned time slot, the leftover time is given to a run queue whose secrecy class dominates that of the previous run queue. Covert-channel countermeasures are not taken in between two run queues if the secrecy class of the second run queue dominates the secrecy class of the first run queue.

20 Claims, 7 Drawing Sheets

| SECRECY LEVELS | SECRECY CATEGORIES |
|---|---|
| TOP SECRET | GRAPE |
| SECRET | ORANGE |
| CONFIDENTIAL | BANANA |
| UNCLASSIFIED | APPLE |

EXAMPLE SECRECY CLASSES

| | |
|---|---|
| TOP SECRET | GRAPE - ORANGE - APPLE |
| CONFIDENTIAL | |
| SECRET | BANANA |
| TOP SECRET | BANANA |

FIG. 1

| | SYSTEM-LOW | CONFID. | CONFID. - NATO | CONFID. - NUCLEAR | CONFID. - NATO - NUCL. | SECRET | SECRET - NATO | SECRET - NUCLEAR | SECRET - NATO - NUCL. | TOP SECRET (TS) | TS - NATO | TS - NUCLEAR | TS - NATO - NUCL. | SYSTEM - HIGH |
|---|---|---|---|---|---|---|---|---|---|---|---|---|---|---|
| SYSTEM-LOW | D | | | | | | | | | | | | | |
| CONFID. | D | D | | | | | | | | | | | | |
| CONFID. - NATO | D | D | D | | | | | | | | | | | |
| CONFID. - NUCLEAR | D | D | | D | | | | | | | | | | |
| CONFID. - NATO - NUCL. | D | D | D | D | D | | | | | | | | | |
| SECRET | D | D | | | | D | | | | | | | | |
| SECRET - NATO | D | D | D | | | D | D | | | | | | | |
| SECRET - NUCLEAR | D | D | | D | | D | | D | | | | | | |
| SECRET - NATO - NUCL. | D | D | D | D | D | D | D | D | D | | | | | |
| TOP SECRET (TS) | D | D | | | | D | | | | D | | | | |
| TS - NATO | D | D | D | | | D | D | | | D | D | | | |
| TS - NUCLEAR | D | D | | D | | D | | D | | D | | D | | |
| TS - NATO - NUCL. | D | D | D | D | D | D | D | D | D | D | D | D | D | |
| SYSTEM - HIGH | D | D | D | D | D | D | D | D | D | D | D | D | D | D |

LEGEND: "D" ⟶ A PROCESS HAVING AN ACCESS CLASS AT LEFT DOMINATES A PROCESS HAVING AN ACCESS CLASS AT TOP.

FIG. 3

LATTICE SCHEDULER METHOD FOR REDUCING THE IMPACT OF COVERT-CHANNEL COUNTERMEASURES

1. BACKGROUND OF THE INVENTION

1.1. Need for Secrecy of Computer Information

This invention relates generally to improving secrecy in a computer system to prevent unwanted access to information. It relates more particularly to a method of reducing the potential for covert-channel communications in the computer system (and thus reducing the frequency at which operations such as cache-clearing must be performed to impede such communications), and of directly closing a scheduler timing channel.

(Those of ordinary skill will recognize that secrecy, i.e., the prevention of unauthorized access to information, is but one component of computer "security," as that term is commonly used. Other components include "integrity," namely the prevention of tampering with the information, and the prevention of unauthorized denial of service. The Department of Defense publication entitled *Department of Defense Trusted Computer System Evaluation Criteria*, sometimes referred to as the "Orange Book," describes a number of common system security objectives and evaluation criteria for secure computer systems.)

Historically, information has been a highly sought-after asset of businesses and governments. Prior to the computer revolution, locked filing cabinets, safes, secured buildings, guards, alarm systems and video surveillance were used to protect important information. Proper physical security measures, such as these, were usually adequate to prevent the undesirable dissemination of information.

Because computers are now being used to store information, instead of filing cabinets, these physical security measures have become less effective. Not only can all users access information within a given computer system, but physical security cannot necessarily protect against communications between the computer system and remote devices. Therefore, many computerized information systems include internal security which may provide users with different levels of access to the computerized information, and may protect the computerized information from other types of undesirable access.

1.2. Secrecy Classifications and Access Rules

A computer system designed for promoting security typically may follow a set of nondiscretionary rules and another set of discretionary rules for access determination.

(a) Secrecy Levels. In order to follow the nondiscretionary rules, each "subject" (i.e., a person or process attempting to access information) and each "object" (i.e., the information that is the object of the access attempt) may be given a security identifier, which is frequently referred to as a "secrecy level." In other words, the data may be classified into various secrecy levels that are reflective of the sensitivity of the data. For example, top secret information might have the highest secrecy level, and only users authorized to have access to the highest secrecy level would thus be permitted to access top-secret information.

(b) Secrecy Categories. Information within a given secrecy level may also be "categorized" for further restriction of access. As a hypothetical example, assume that, within a secrecy level designated "Top Secret," there exist three categories of information, Grape, Orange, and Strawberry. Access to each category may be restricted to those having not only the requisite top-secret clearance but clearance for the particular category as well (e.g., on a need-to-know basis).

(c) Secrecy Classes. The term "secrecy class" is customarily defined as comprising (i) a secrecy level and (ii) zero or more secrecy categories. In the example of the previous paragraph, three secrecy classes are mentioned, namely Top Secret-Grape, Top Secret-Orange, and Top Secret-Strawberry. "Top Secret" with no secrecy categories would also be an example of a secrecy class, as would "Secret Grape-Orange-Strawberry."

In mediating access to memory or other storage, a computer system may compare the secrecy class of a subject to the secrecy class of an object, and determine if the subject is allowed to access the object. In this manner, access to sensitive information can be limited to a select user group.

1.3. Nondiscretionary Rules

Two fundamental nondiscretionary rules help restrict access by users to information. These rules are the "simple security condition," which aims to prevent a subject from reading more highly classified objects; and the "*-property [pronounced 'star property']" rule, the goal of which is to prevent a subject from writing less highly classified objects. Both are aimed at blunting attacks that might be deliberate (e.g., malicious or simply reckless) or accidental, and from a human user or from software.

(a) Simple Security Condition. The "simple security condition" can help prevent a user or a computer process from accessing (e.g., reading) data unless (a) his or its authorized secrecy level is greater or equal to the secrecy level of the information, and (b) his or its secrecy class includes all categories of the data in question. For example, consider a subject whose secrecy class was SECRET-NATO (i.e., the subject's secrecy level is SECRET, and the subject's only secrecy category is NATO). This subject would not be allowed to access data of any secrecy category (e.g., NATO, NUCLEAR, or no-category) whose secrecy level was TOP SECRET. Nor would the subject be allowed to read data of any secrecy level, even CONFIDENTIAL data, that had a secrecy category not possessed by the subject (e.g., CONFIDENTIAL-NUCLEAR).

(b) Star Property. The "*-property" rule (also called the "confinement property"), endeavors to prevent illicit indirect viewing of a first type or class of object through copying to a second type of object that has a "lower" secrecy class than the first object. The *-property addresses this by preventing a subject from writing to a second type of object (e.g., by copying information to the second object from the first object) unless (a) the secrecy level of the second type of object is greater than or equal to the secrecy level of the subject, and (b) the above-mentioned secrecy category clearances of the subject and objects are such that the writing operation is authorized.

For example, an unclassified file might be unmodifiable by a TOP SECRET process to prevent TOP SECRET information from being copied to the unclassified file. Therefore, the computer system should endeavor to prevent access by undesirable users, even if they are aided and abetted by Trojan horse software as discussed in the next section.

1.4. The "Trojan Horse" Problem and Covert-Channel Communication

Not only should a computer system protect the computerized information from undesirable users, but also from undesirable software that operates illicitly in a "high"

secrecy class. "Trojan horse" software appears to be legitimate soft-ware, but in fact is designed to operate illicitly within the computer system. A Trojan horse may be implanted in commonly used software, and may access a user's files without the knowledge of the user.

For example, a Trojan horse might operate as part of a TOP SECRET process. The Trojan horse might be able to access a file and copy the information contained therein into another file. This alone is not necessarily a problem, but it could be a serious problem if the information were to be passed on to a user or process not authorized to receive it. The problem can be made worse by the fact that a Trojan horse program is typically difficult to find, even after it has been functioning.

Under the *-property of a computer system, a program operating on behalf of a user (or a Trojan-horse process) should be prevented from passing information to any other user having a "lower" secrecy class. Trojan horse programs therefore attempt to use covert channels to transmit information illicitly. A "covert channel" in a computer system is a communication channel that allows one or more processes operating in a computer system (e.g., one or more programs) to transfer information in a manner that violates the system's security policy, e.g., to transfer information to unauthorized users.

(a) Scheduler Covert Timing Channels. An example of a covert channel is found in the illicit use of the timing of scheduler functions. As those of ordinary skill are aware, scheduler functions (or functions performing the same role) are part of the operating system of a multiprocessing computer system. These functions serve to allocate CPU time as a resource among various processes.

Suppose that two processes are running on a computer system: (1) a "Trojan-horse" sending process in the TOP SECRET-GRAPE access class, for illicitly sending information, and (2) a "spy" receiving process in the UNCLASSIFIED secrecy class for receiving the illicitly sent information. Further suppose that the computer system's scheduling functions permit each of the two processes to operate in "time quanta" of, say, up to 10 milliseconds (ms) at a time before being preempted for other work. Finally, suppose that the receiving process can monitor the time actually used by the sending process, e.g., by noting the real or clock time at which its own quantum begins. (This could happen if the Trojan horse sending process and the spy process are the only two running processes, which in turn could occur during periods of very low computer-system activity, e.g., late at night.)

The sending process can then signal the receiving process by modulating the portion that it actually uses of the time quanta allocated to it. For example, the sending process might generate an "on" bit by performing timeconsuming operations (e.g., by busy-looping or using NOPs to waste CPU cycles) to use up an entire 10-ms quantum. The sending process could similarly generate an "off" bit by stopping at 5 ms (e.g., by using a WAIT instruction to surrender control of the CPU after issuing enough NOPs or other timeconsuming instructions to use up 5 ms). The receiving process, by monitoring the clock time at which it is given control of the CPU (and thus the time actually used by the sending process), can receive and decode messages sent in this manner by the sending process.

(b) Cache-Type Covert Timing Channels. As another example, covert channels can be exploited by modulating the usage of cache storage. As those of ordinary skill are aware, cache storage is a comparatively high speed memory (or disk storage, but memory caches are more effectively used as covert channels and therefore are of greater concern) that is used for temporary storage of frequently-accessed data. Caches are typically used when a memory access operation (e.g., a read operation) is performed that requests information from particular memory locations. The cache controller "receives" the information request and checks whether the request can be satisfied from the comparatively high-speed cache storage. If this is not the case, the cache controller copies not only the requested information from the designated memory locations, but information from memory locations near the designated locations. This increases the likelihood that a subsequent information request can be filled from cache storage. To the extent that requests for data can be satisfied from the cache storage instead of from the comparatively slower regular storage, the speed of the system is thereby increased.

Cache memory is of comparatively small size; thus any given location in cache memory may be mapped to multiple addresses and hence be frequently used by more than one process. Suppose that process A performs a memory access; the cache controller copies the accessed information into certain addresses of the cache memory for future reference. Control of the CPU might subsequently be turned over to another process B which performs its own memory-access operations. Depending on the memory addresses so accessed, the cache memory might be overwritten (thus destroying the information stored in the cache for use by process A). Such an event is known in the art as a "collision."

Information can thus be illicitly transmitted by modulating the time required to complete a read operation. Suppose that a "spy" receiving process is designed routinely to read repeatedly from the same range of addresses in main memory. Every time the spy's read operation can be satisfied by consulting the cache storage instead of main memory, the operation will be completed more quickly. Further suppose that a Trojan-horse sending process can perform memory-access operations that cause "re-use" of the specific cache storage locations that are accessed by the receiving process.

The sending process could then signal the receiving process by selectively performing memory-access operations that cause overwriting of selected portions of the cache storage. The resulting selective collisions in cache storage would force the receiving process to take more time completing a read operation; the receiving process could monitor the time required to complete its reads and decode the resulting information. For example, an "on" bit could be sent by the sending process by causing a collision in cache storage, while an "off" bit could be sent by leaving the cache storage intact.

(c) Closure of Covert Channels. Cache-type covert channels and scheduler covert channels are but two examples of covert channels. A requirement for a computer system to receive an A1, B3, and B2 rating from the National Computer Security Center (NCSC) is to close all or some covert channels, or alternatively to reduce the bandwidth (that is, reduce the rate at which information can be transferred) of such covert channels.

The closure of many covert channels exacts a high performance penalty. One means of closing a cache-type covert channel, for example, is to clear (erase) the cache storage upon some or all "context switches," i.e., when control of the CPU is transferred from one process to another. On modern computers, such an operation will significantly degrade performance.

As for a scheduler-type covert channel, a comparatively straightforward solution to closing the channel is to assign each running process a fixed quantum of CPU time and to idle away any remainder of the assigned time if the running process does not use it up. Because the start of a process's quantum is now unaffected by how much CPU time was consumed by the previous process, this approach effectively closes the channel. This solution is, however, likely to perform poorly because it wastes leftover CPU time.

2. SUMMARY OF THE INVENTION

This invention includes a scheduler for scheduling the use of resources (e.g., CPU time) by a plurality of "consumers" (e.g., computer-system processes), each belonging to one of a plurality of classes (e.g., secrecy classes) that is partially ordered by a dominance relationship. In an illustrative embodiment, the scheduler uses access-class information (specifically secrecy-class information, which those of ordinary skill will recognize as being a subset of access-class information) to schedule processes.

The illustrative scheduler schedules processes in "nondecreasing" secrecy-class order, as discussed below. Covert channel countermeasures need not be performed when the secrecy class of the new process is equal to or "higher" than that of the previous process (because by definition the higher secrecy-class process is permitted to have access to all information accessible to the same or "lower" secrecy-class process). The scheduler thus reduces the potential for covert-channel communication and thus the frequency at which covert channel countermeasures need to be performed. This in turn leads to improved system performance.

The invention includes a basic lattice-type scheduler that takes into account both secrecy level and category information, as well as several variations that can be used to achieve better CPU utilization.

3. BRIEF DESCRIPTION OF THE DRAWINGS

FIG. 1 illustrates some combinations of secrecy levels and secrecy categories to form secrecy classes.

FIG. 3 is a chart that shows all "dominance" relationships among the hypothetical secrecy classes, including the aforementioned direct-dominance relationships.

Figure 4:
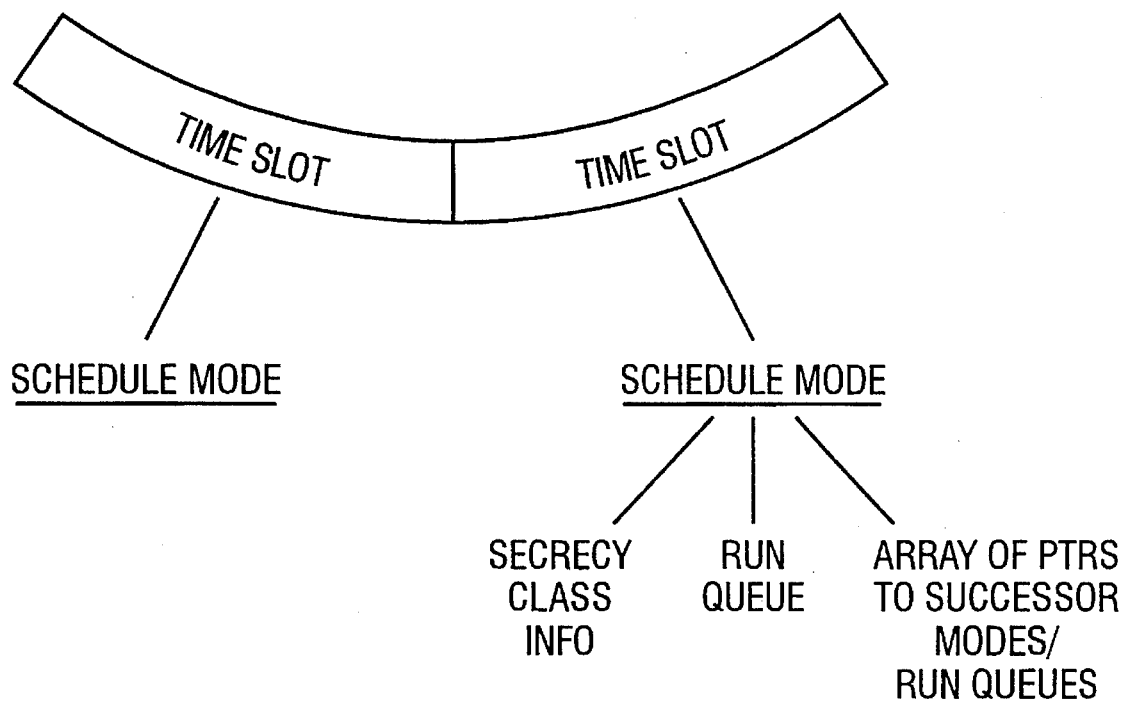
Figure 5:
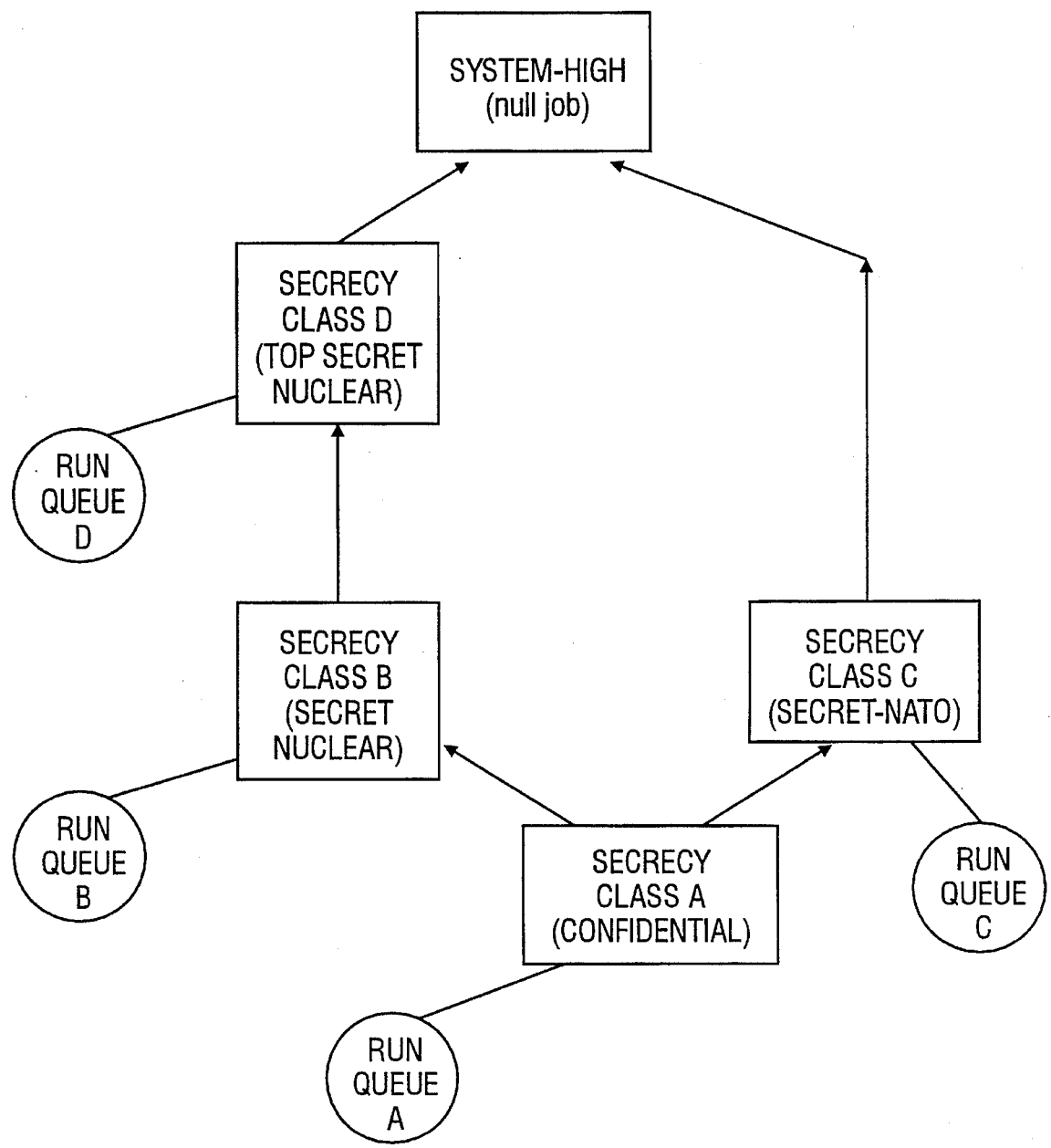
Figure 6:
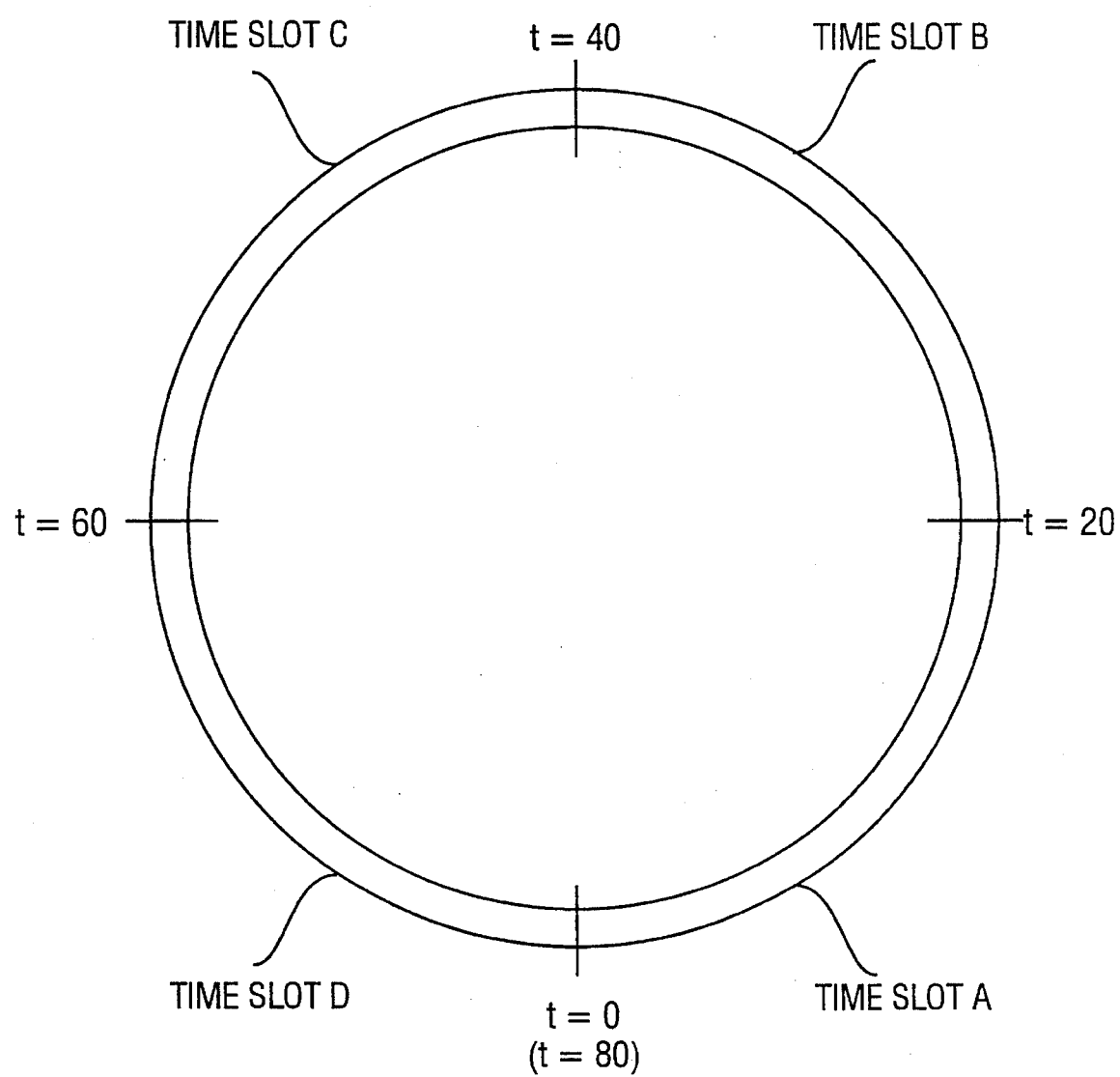

FIG. 4 illustrates the relationship between a time-slot ring and a secrecy class assigned to a particular time slot in conjunction with the operation of a scheduler in accordance with the invention. FIG. 5 shows a simple hypothetical lattice data structure, used by such a scheduler, for purposes of illustration. FIG. 6 shows a simple time-slot ring that is discussed in an example below.

Figure 7:
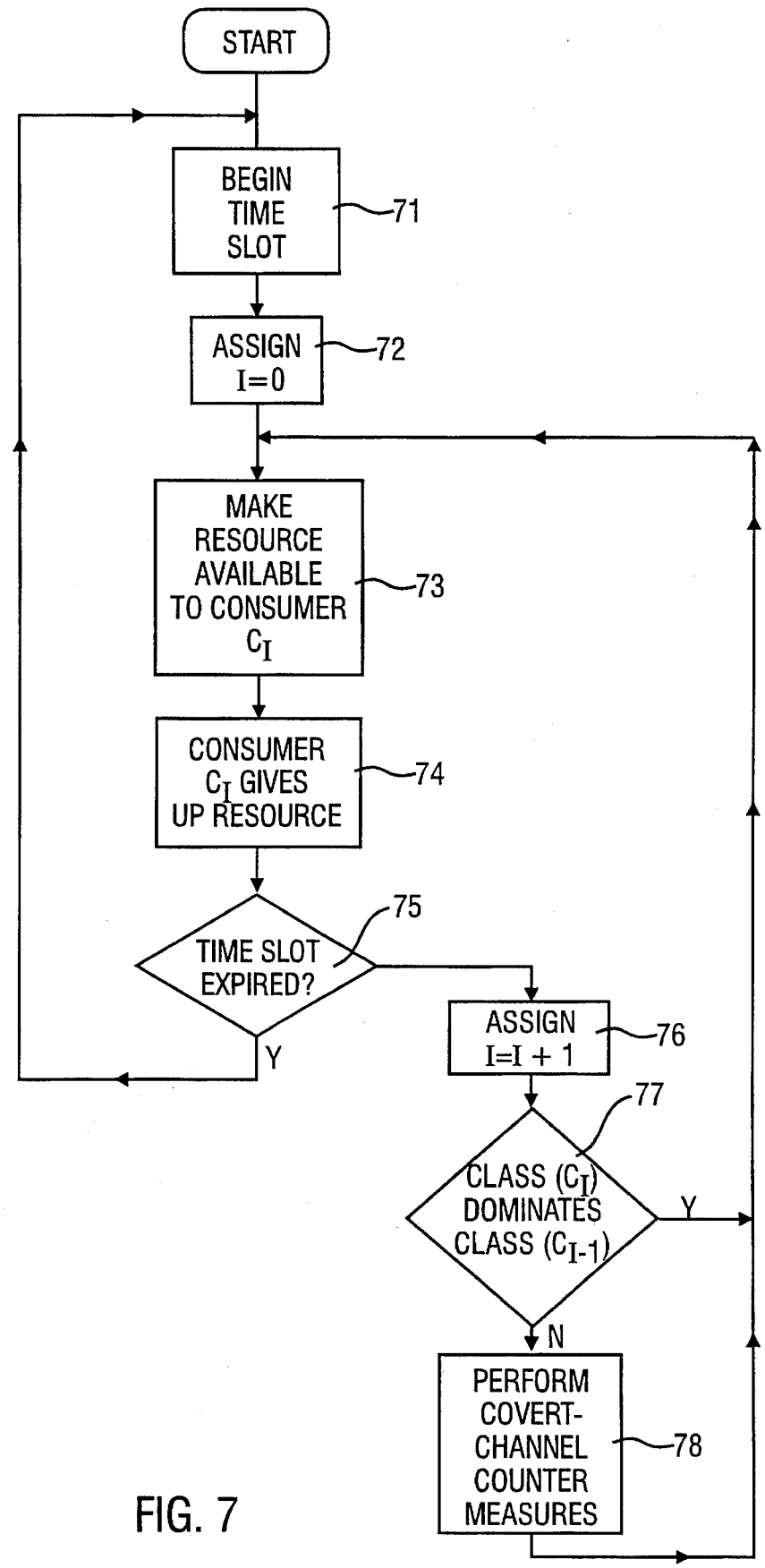

FIG. 7 is a flow chart depicting graphically in simplified from the method steps of the claimed invention.

Appendices 1 and 2, reproduced at the end of this specification and prior to the claims, are pseudocode descriptions of a set of exemplar data structures and a set of program routines, respectively, for purposes of illustrating an approach to implementing the invention.

4. DETAILED DESCRIPTION OF SPECIFIC EMBODIMENTS

To illustrate the invention, an exemplar scheduler is described below. The invention may usefully be implemented by programming the computer to perform the functions described herein.

4.1. Pseudocode for Exemplary Illustration

This specification includes a description of an exemplar design for a computer program in accordance with the invention. The description includes appendices that set forth, in a Pascal-like "structured English" pseudocode format, illustrative data structures and operating routines for the program. The description is intended to be a general one and is not meant to be limiting.

The actual optimum organization and structure of a particular computer program in accordance with the invention will depend greatly on the characteristics of the system on which the invention is implemented. Certain specific machine functions described herein may not be available on a given machine and must be simulated; or, a group of functions described herein may be able to be collapsed into fewer functions on another machine. Likewise, the data structures shown in the pseudocode are presented for purposes of illustration; other data structures may be more appropriate in specific implementations (e.g., on a particular type of machine or in implementing the invention for particular security models).

The description is only an outline and does not necessarily set forth a complete program listing. For example, testing for boundary conditions or errors is sometimes described explicitly and sometimes is referred to implicitly. By and large, the description does not set forth error trapping/ handling or similar functions.

It will be recognized by those of ordinary skill that, given the benefit of this disclosure, the implementation of a computer program on any given model of computer running any given architecture, to take advantage of the features of the computer and operating system, is a matter of conventional programming for those familiar with the particular computer and operating system.

4.2. The Lattice Scheduling Model as Illustration

The illustrative scheduler implements a novel version of a known lattice security model (see, e.g., Bell, D. E., and La Padula, L. J. (1973) "Secure Computer Systems: Mathematical Foundations and Model," MITRE Corporation publication no. M74-244). In the model, each process to be run by the computer system is assigned a secrecy class that includes a secrecy level and a set of secrecy categories, as discussed in more detail in section 1.2. The secrecy level may correspond to customary classifications such as SECRET and TOP SECRET. As discussed above, secrecy categories provide means to further compartmentalize access within levels and may have labels such as NATO and NUCLEAR. FIG. 1 shows several such secrecy classes and their component secrecy levels and secrecy categories.

(a) Dominance Relationships Among Classes. It will be apparent to those of ordinary skill having the benefit of this disclosure that a partial ordering exists within the set of secrecy classes. As those of ordinary skill are aware, a secrecy class A is defined as "dominating" another secrecy class B if the following conditions are true:

1. the secrecy level of secrecy class A is greater than or equal to the secrecy level of secrecy class B, and 2. the secrecy category set of secrecy class A is a "superset" of the secrecy category set of secrecy class B. That is, secrecy class A must include at least all the secrecy categories of secrecy class B.

For example, the secrecy class TOP SECRET NUCLEAR dominates the secrecy class SECRET NUCLEAR because both of the above conditions are satisfied. It does not dominate the secrecy class SECRET NATO, however, because the two secrecy categories are disjoint and the second condition is not satisfied.

Two other points of "dominance" nomenclature are used herein. First, for convenience, any secrecy class is defined as dominating itself. Second, a process having a secrecy class A is said to "directly dominate" a secrecy class B if (1) A dominates B and (2) no secrecy class C exists such that A dominates C and C dominates B.

Figure 2:
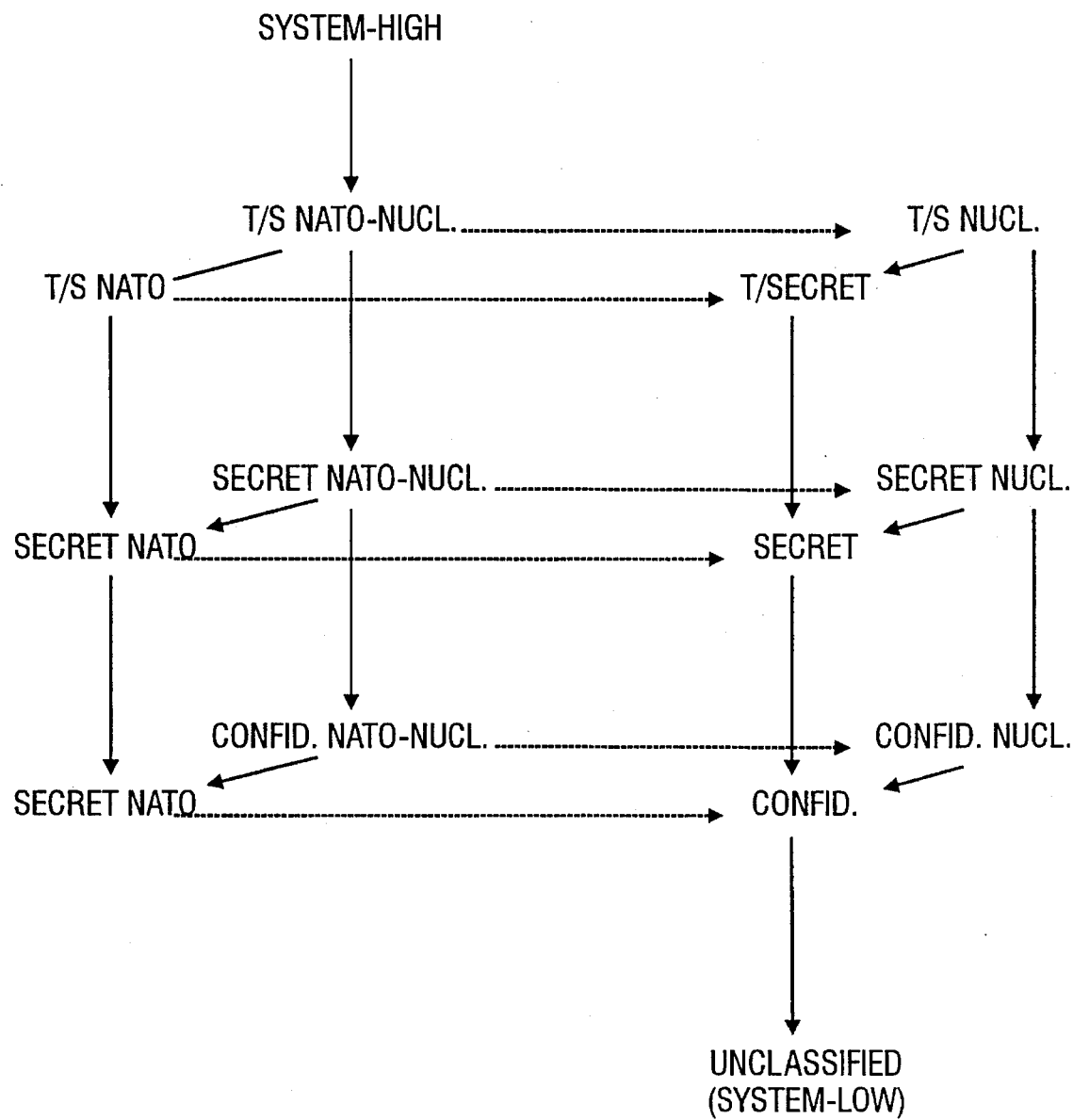
FIG. 2 is a lattice-like diagram showing "direct dominance" relationships among a number of hypothetical secrecy classes in a security system wherein such classes are organized according to a lattice model.

FIG. 2 shows graphically, through the use of arrows, the dominance ordering among a number of hypothetical secrecy classes (only direct dominance relationships are depicted with arrows in the figure). In the example illustrated in FIG. 2, it will be seen that, for example:

(a) the secrecy class SECRET NATO directly dominates the secrecy class CONFIDENTIAL NATO;

(b) the secrecy class SECRET NUCLEAR directly dominates CONFIDENTIAL NUCLEAR;

(c) each of the three secrecy classes SECRET, SECRET NATO, and SECRET NUCLEAR dominates the secrecy class CONFIDENTIAL, but of these three, only SECRET directly dominates CONFIDENTIAL;

(d) the secrecy class TOP SECRET NATO dominates, but does not directly dominate, CONFIDENTIAL NATO because of the intervening secrecy class SECRET NATO;

(e) the secrecy class TOP SECRET NATO does not dominate the secrecy class SECRET NUCLEAR because of the disjointness of the secrecy categories (NATO vs. NUCLEAR).

It will be noted that the lattice model thus imposes only a partial ordering, because the secrecy categories of two secrecy classes can be disjoint.

(b) Special Secrecy Classes. Two special secrecy classes are defined. The SYSTEM_HIGH secrecy class is defined as dominating all secrecy classes; it consists of the highest secrecy level and includes all secrecy categories. The SYSTEM_LOW secrecy class, on the other hand, is defined as being dominated by all secrecy classes; it has the lowest possible secrecy level (e.g., UNCLASSIFIED) and no secrecy categories. In the example shown in FIG. 2, the UNCLASSIFIED secrecy class is in effect the SYSTEM_LOW class, in that it is (arbitrarily) shown as having no secrecy categories.

The lattice model is conceptually completed by the inclusion of these two two special classes. These classes ensure that every secrecy class except SYSTEM_HIGH and SYSTEM_LOW both dominates some other secrecy class (other than itself) and is dominated by some other secrecy class (other than itself).

An example of such a lattice model is partially shown in FIG. 2 and is more completely defined in a table in FIG. 3. As noted above, arrows in FIG. 2 show direct-dominance relationships, i.e., an arrow pointing from one secrecy class (e.g., TOP SECRET NUCLEAR) to a second one (SECRET NUCLEAR) means that the first secrecy class directly dominates the second.

While FIGS. 2 and 3 show the basic conceptual arrangement of lattice models for use with the scheduler method described herein, it should be emphasized that, in the illustrative embodiment described here, any given lattice data structure used in an operating computer system will normally include only the secrecy classes for existing processes. Depending on the secrecy classes of the processes that exist in any particular system at any particular time, one or more of the secrecy classes shown in FIGS. 2 and 3 may not be present in an actual lattice at any given time.

Furthermore, a similar lattice can be defined in essentially the same manner for "integrity" classes, as will be recognized by persons of ordinary skill having the benefit of this disclosure ("integrity" classes embody a security concept related to but distinct from secrecy classes). Such persons will recognize, with the benefit of this disclosure, that in such an integrity lattice, the dominance relationship is essentially the inverse of that shown in the secrecyclass lattice discussed here. A secrecy-class lattice and an integrity-class lattice can be joined to form a single composite lattice in accordance with the principles explained here.

Moreover, other security policies may allow the use of security models other than the lattice model. The scheduler method described here can be applied in similar fashion to other security models in which a partial ordering is imposed on the processes to be scheduled (i.e., in which a directed-graph representation of the model can be used).

A "null job" or other time-consuming process is ordinarily assigned to the SYSTEM_HIGH secrecy class for programming convenience. It can be useful to have a SYSTEM_HIGH process running to simplify traversal of the lattice as discussed below. A SYSTEM_LOW process is not always necessary but may be included as desired.

In some systems, a system-level secrecy class for certain highly-privileged processes (e.g., system processes) may be defined that dominates all secrecy classes associated with user processes. Such a secrecy class may be assigned to an extra secrecy class that is "sandwiched" into the lattice between the SYSTEM_HIGH secrecy class and (in the example of FIGS. 2 and 3) the TOP SECRET NATO-NUCLEAR secrecy class. "System" processes can be assigned signed to this special class because they do not affect the security properties of the computer system. For example, going from A→S→B (where A and B are processes and S is a system process) is essentially the same, in terms of determining whether covert-channel countermeasures should be taken, as going directly from A to B. This is because system processes, which by definition have been verified and thus are part of the trusted computing base (TCB) in a secure computer system, are assumed not to be high-speed covert channel transmitters. Where such system processes exist and are runnable, they can be run in lieu of the "null job" to avoid needlessly wasting operating time. Alternatively, a collection of system-level secrecy classes could be defined, all sandwiched between SYSTEM_HIGH and (in the example of FIGS. 2 and 3) the TOP SECRET NATO-NUCLEAR class.

(c) Data Structure for Lattice. The scheduler may make use of a data structure in memory (or similar storage) in which information about all existing processes and their secrecy classes is assembled. Appendix 1 outlines an exemplar data structure based on the lattice model as well as the component parts of the data structure. The comments in Appendix 1 explain some of the design choices reflected in the data structure. The exemplar lattice data structure is partially illustrated in FIG. 4.

4.3. Basic Scheduling Method

Generally speaking, the scheduler operates in the following manner:

1. All existing processes having the same secrecy class are assigned to a run queue for that secrecy class;

2. Each secrecy class that has processes so queued is assigned to a time slot in a time slot ring; during any given time slot, the processes queued for the corresponding secrecy class are run, in any convenient order using conventional queue processing or other techniques, until the time slot ends;

3. If time is left over within any given time slot (i.e., if time is left over after all queued processes in the corresponding secrecy class have given up the CPU), then the scheduler selects a successor run queue of processes by traversing the lattice data structure towards the SYSTEM_HIGH secrecy class.

This traversal means that, after the beginning and before the end of any particular time slot, the scheduler always selects a successor run queue of processes whose secrecy class dominates (directly or indirectly) that of the run queue that "owns" the time slot. This scheduling policy takes advantage of the fact that a covert channel cannot exist from a process A to another process B whose secrecy dominates A. (If B dominates A, then B is allowed to openly access the information with A, hence a covert channel serves no purpose.)

If the scheduler exhausts the successor run queues by a traversal of the lattice data structure toward SYSTEM_HIGH and time is still left over within any given time slot, then the scheduler selects a SYSTEM_HIGH null job or systemlevel job to run. Alternatively, depending on the overhead involved, the scheduler may invoke appropriate covert-channel countermeasures and begin a new traversal of the lattice data structure anew, using a different path.

A pictorial overview of the basic method of operation of the scheduler in shown in FIG. 7. At block 71, a time slot such as is shown in FIG. 4 begins. At blocks 72 and 73, a resource such as a CPU is made available for use by a consumer $C_i$ such as a process. At block 74, the consumer $C_i$ gives up the resource. If the time slot has not yet expired (decision block 75), the resource is made available for use by a subsequent consumer $C_{i+1}$ in block 76 and (repeated) block 73, except that if the class of consumer $C_{i+1}$ is determined (in decision block 77) not to dominate the class of consumer $C_i$, then a covert-channel countermeasure is performed in block 78 before making the resource available for use by the consumer $C_{i+1}$.

(a) Construction of Time Slot Ring. Initial time slots are assigned to all secrecy classes that have existing runnable processes. This may be done by building a circular linked list of processes for running (referred to sometimes here as a "time slot ring"). The time slot ring may conveniently be constructed by traversing the lattice data structure of secrecy classes as necessary to visit all nodes in the data structure. Any runnable processes found to exist at any secrecy class are added to a run queue for that secrecy class (these processes may be queued in any convenient order).

The exact manner of traversal of the data structure to construct the time slot ring will vary with the particular security model being implemented (e.g., with the number and arrangement of secrecy levels and categories). The traversal preferably is performed in a manner that minimizes the number of separate "runs" that are made through the data structure to visit every node. A "run" is a path through the lattice connecting nodes along inverse direct-dominance relationships. For example, a node can be added at the end of a run (1) when it has not been visited before, i.e., it is not already part of a run, and (2) its secrecy class directly dominates the secrecy class of the immediately-previous node in the run (if the run is non-empty)). This approach helps reduce the number of "backups" required during the traversal, and thereby reduces the occasions on which covert-channel countermeasures will be appropriate when queued processes are scheduled for running. In some implementations the traversal may conveniently resemble a "depth-first" traversal.

As shown in FIG. 2, the traversal of the lattice data structure starts at the bottom (i.e., at the UNCLASSIFIED class) and works its way "up" toward "higher" levels of security (note that this is opposite the direction of the dominance-relationship arrows shown in the Figure). For example, the lattice in FIG. 2 can be divided into four runs along the vertical lines shown in the Figure. Working right to left in the Figure, the first run could include the secrecy classes having NUCLEAR categories and no other; the second run could include the secrecy classes having no categories; and so forth. The SYSTEM_HIGH secrecy class is temporarily ignored during construction of the time slot ring until the end of the traversal. That class may be appended as the last entry in the time slot ring, thus making it "adjacent" in the time slot ring to the "lowest" secrecy class having runnable processes.

It will be seen that each slot in the time slot ring corresponds to a queue of processes that share a common secrecy class. This guarantees that every secrecy class having runnable processes is assigned a time slot. The depth-first-like traversal of the lattice serves to assign run queues to time slots in an order such that their respective secrecy classes are as "non-decreasing" as possible. This reduces the number of times that covert-channel countermeasures need to be taken.

It will be noted that not every secrecy class needs to be assigned a time slot at any particular time, because not every secrecy class will have runnable processes at that time. For convenience, a secrecy class may be assigned a slot in the time-slot ring if nonrunnable processes exist in that secrecy class (e.g., processes in that secrecy class that are awaiting user input); in this situation the run queue for the secrecy class in question would be empty.

(b) Selection of Next Process. The scheduler selects processes for execution as set forth in the pseudocode appendices, which may be summarized and explained as follows:

Step 1. At the beginning of each time slot, the run queue which "owns" the slot, referred to here as the "new" run queue, is selected for running by checking the corresponding position in the time slot ring. (See Appendix 2, lines 213 et seq., describing the "clock_interrupt_service" routine.) The new run queue is checked to determine whether any runnable processes exist in that run queue. If so, one such process is selected in any convenient manner for running; otherwise, a process is selected from a run queue of processes whose secrecy class dominates that of the new time slot. (See id., lines 223–225; see also id. at lines 166 et seq., describing the "get_next_process_to_run" routine.) It will be noted from the pseudocode that if no such process exists and is runnable, then control is ultimately given to the null job in the SYSTEM_HIGH secrecy class (or to a system process if one exists and is runnable).

Before the selected process is actually given control of the CPU (note that by hypothesis the process in question is to be the first process to be run in the new time slot), if the selected process is a nonsystem process a determination is made whether first to take covert-channel countermeasures as follows. A comparison is made between the secrecy class of the process selected for running and the "higher" of (i) the secrecy class of the last nonsystem process that was run in the immediately-preceding time slot, and (ii) the secrecy class of the run queue that "owned" that time slot. If the secrecy class of the process selected for running does not dominate the secrecy class with which the comparison is made, then any desired covert-channel countermeasures, e.g., clearing the cache, may be taken prior to actually giving control of the CPU to that process. It will be noted from the pseudocode (see Appendix 2, lines 228–239 205 and 206) that this comparison may be facilitated by initializing a variable last_access_class to the secrecy class of the current time slot at the beginning of that time slot, and subsequently resetting the variable to the secrecy class of any nonsystem process that is run during the time slot. Alternatively (and depending on overhead and similar considerations), the comparison may be made with the secrecy class of the last nonsystem process to be run, regardless of whether or not it was run in the immediately preceding time slot (as discussed below, however, this alternative introduces the possibility of runnability as a potential covert channel).

As discussed below in connection with Step 2, the secrecy class of any process that is run during a time slot is guaranteed to dominate the secrecy class of the time slot itself. It therefore follows that the secrecy class stored in the last_access_class variable is never decreased during a given time slot. Appropriate countermeasures may be taken whenever the CPU is subsequently to be given to a new process whose secrecy class does not dominate the "current secrecy class."

Step 2. If, prior to the expiration of the current time slot, a process in the run queue is not runnable when its turn in the queue comes up (or if a running process becomes not-runnable by giving up control of the CPU), then a "successor process" is sought in the same run queue (i.e., in the run queue for the same secrecy level). Any convenient method may be used to seek a successor process within that run queue. (See Appendix 2, lines 174–182.)

Step 3. If all processes in the current run queue give up the CPU prior to the expiration of the current time slot, then a successor run queue is sought in a secrecy class that directly dominates the current process's secrecy class (i.e., a successor run queue is sought "above" the current run queue in the lattice). If more than one potential successor run queue is found, a specific successor run queue is selected for running, perhaps randomly or pseudorandomly as a further covert-channel defense (see Appendix 2, lines 188–207). Methods of generating pseudorandom selections are well-known in the art. In one embodiment, the random number initial seed is based on a hardware (as opposed to a software) event. The algorithm for generating successive random numbers preferably should be computationally difficult to invert, but any convenient algorithm may be used.

Processes from a successor run queue (selected in the manner described above) are run until one of the following events occurs:

(a) If the current time slot ends before the then-current process gives up control of the CPU, then the scheduling method resumes at step 1, and control of the CPU is thereby given to the next (e.g., first) queued process from the run queue that owns the new time slot; or (b) If the then-current process gives up the CPU before the current time slot ends, then step 2 (and possibly step 3) is repeated and another process (possibly from still another run queue) is thereby sought for running.

On the other hand, if no eligible successor run queue is found in the lattice of existing run queues, then a system process (or the "null job" at SYSTEM_HIGH in the lattice if no system process is runnable) is run until the end of the current time slot.

In any event, at the end of the current time slot the scheduling method resumes at step 1.

It will be noted that the secrecy-class comparison that is performed in step 1 serves to ensure that no process of a "lower" secrecy class is ever given control of the CPU immediately after a nonsystem process of a "higher" class, nor after the expiration of a time slot of a "higher class," without the execution of appropriate covert-channel countermeasures. Because of the order in which nonsystem processes are given control of the CPU, however, this comparison also helps reduce the number of times that such countermeasures are required.

4.4. Illustration of the Scheduling Method

FIG. 5 shows a simplified lattice of four hypothetical secrecy classes A through D for use as an illustration; FIG. 6 shows a time slot ring whose slots are allocated to the four secrecy classes and their corresponding run queues.

(a) Dominance Ordering of Run Queues. As will be seen from FIG. 5, in the simplified hypothetical case:

Every process's secrecy class dominates the secrecy class of secrecy class A (which is CONFIDENTIAL).

Secrecy class B (SECRET NUCLEAR) and secrecy class C (SECRET NATO) are disjoint, because while they have the same secrecy level (SECRET), they have different secrecy categories (NUCLEAR vs. NATO).

Secrecy class D (TOP SECRET NUCLEAR) directly dominates secrecy class B (SECRET NUCLEAR).

Secrecy classes B (SECRET NUCLEAR) and C (SECRET NATO) directly dominate secrecy class A (i.e., CONFIDENTIAL).

Secrecy class D (TOP SECRET NUCLEAR) does not dominate the secrecy class C (SECRET NATO) because they are disjoint, i.e., they have different secrecy categories (NUCLEAR vs. NATO).

The null job is at SYSTEM_HIGH; its secrecy class dominates all others.

(b) Selection of Successor to Run Queue A. Another nomenclature point will be made here: as used in the discussion of this example, the term "run queue A" means the queue of runnable processes that have secrecy class A, and "time slot A" means the time slot assigned to run queue A.

For the purpose of this example, it is assumed that when a choice needs to be made at branch points (e.g., deciding whether a process from run queue B or run queue C should be run if the processes of run queue A do not use up time slot A), the method used to make the choice is sometimes referred to for convenience as a 'consumer-running selection method.' In this example, the choice is made randomly; in other embodiments as discussed below the selection may be made in an manner other than randomly. As discussed below, this makes the scheduling independent of the processes' runnability. An initial assignment where each run queue gets an equal slot might result in a circular timeline as shown in FIG. 6, where the interval between t=0 and t=20 is run queue A's assigned slot, and so forth. A complete scheduling cycle for the four run queues A through D begins at t=0 and ends at t=80.

If the runnable processes in run queue A do not use up time slot A and the CPU is given up at, say, t=15, then the leftover time in time slot A (which in this example is 5 ms) can be given to a process from any run queue whose secrecy class directly dominates that of run queue A (in this example, either run queue B or run queue C). The choice of a specific run queue to receive the leftover CPU time is made randomly or pseudorandomly in this embodiment.

(c) Run Queue B as Successor. Assume that the leftover CPU time in time slot A is assigned randomly to run queue B. In such a situation, the following cases can occur:

(1) If no process in run queue B is runnable, then the scheduler attempts to find another eligible successor process by traversing the lattice data structure towards the SYSTEM_HIGH node. As shown in FIG. 5, this search results in the selection of run queue D. The scheduling method then resumes. It will be noted that run queue C is not selected, because secrecy class B is not dominated by secrecy class C (because the two secrecy categories are disjoint).

(2) If a process from run queue B is indeed runnable, then it is given control of the CPU and starts executing.

(3) If all processes from run queue B give up the CPU before time slot A ends (i.e., if the CPU is surrendered by the last-running process from run queue B at t<20), then the scheduler traverses the lattice again in an attempt to find another process to run. It does so in the same manner as when the processes from run queue B are not runnable; this again results in the selection of run queue D.

(4) On the other hand, if time slot A ends before all processes from run queue B yield the CPU (i.e., if t=20 but some process from run queue B is still running), then the scheduler preempts the process from run queue B and runs a process from the run queue which owns the next time slot. In this case, run queue B owns the next time slot, so its processes will continue to run. Inasmuch as secrecy class B dominates both the secrecy class of the last nonsystem process to be run (i.e., secrecy class B itself) and the secrecy class of the previous time slot (i.e., secrecy class A), it follows that no covert-channel countermeasures are taken.

(d) Run Queue C as Successor. Now assume instead that the leftover CPU time in time slot A is randomly assigned to run queue C, instead of to run queue B, after run queue A gives up the CPU (which by assumption occurs when t <20). Then one of the following cases can occur:

(1) If no process from run queue C is runnable, then the scheduler attempts to find an eligible successor process by traversing the lattice towards SYSTEM_HIGH. In this example, there is no eligible successor process. The scheduler does not select run queue B or run queue D, even if some process from one of those run queues is runnable, because their common secrecy category (NUCLEAR for both run queues B and D) is disjoint from that of run queue C (NATO). Thus, because no other process is eligible to be a successor process, the scheduler runs the null job at SYSTEM_HIGH (or a system process if one is runnable) until time slot A ends (i.e., until t=20). At the end of that time slot (i.e., when time slot B begins at t=20), the scheduler attempts to run a process from run queue B, which owns time slot B. Inasmuch as secrecy class B dominates both the secrecy class of the last nonsystem process to be run (i.e., secrecy class A) and the secrecy class of the previous time slot (again secrecy class A), it follows that no covert-channel countermeasures are taken.

(2) On the other hand, if some process from run queue C is runnable, then it is given control of the CPU. If all processes from run queue C yield the CPU before time slot A ends (i.e., if the CPU is yielded at t<20), then the scheduler again idles away the remainder of the time slot because SYSTEM_HIGH is the only secrecy class that dominates secrecy class C. It will be noted that, because control is in fact given to some process in run queue C during time slot A, then when time slot A ends (i.e., when t=20), if control is given to a process from run queue B (which owns the next time slot), then covert-channel countermeasures will be taken. Secrecy class B does not dominate secrecy class C (the secrecy class of the last-running nonsystem process to run in the previous time slot), and so covert-channel countermeasures are appropriate when the run queue is changed, even though secrecy class B does dominate the secrecy class of the previous time slot (i.e., secrecy class A).

A variation on the above hypothetical situation is instructive. Suppose that control is given to a process from run queue C until the end of time slot A as assumed in the previous paragraph. Now assume that during time slot B no processes from either run queue B or run queue D (which is the only directly-dominating run queue of run queue B) are runnable. In such event, the remainder of time slot B is given to the null job at the SYSTEM_HIGH secrecy class (or to a system process if one is runnable). At that point (i.e., the beginning of time slot C), the scheduler checks to see whether control of the CPU should be given back to run queue C, this time because it owns time slot C. Because secrecy class C does not dominate secrecy class B (the class of the previous time slot), countermeasures are again taken at the beginning of time slot C if control is to be given to a process in run queue C, even though by assumption no nonsystem process was run during time slot B. Alternatively, if countermeasures are taken with regard only to the secrecy class of the lastrun nonsystem process (which in this case was a process in secrecy class C during time slot A), and not with regard to the secrecy class of the immediatelypreceding time slot (in this case, time slot B), then countermeasures are not taken when control is returned to a process in run queue C during time slot C, because by definition secrecy class C dominates secrecy class C.

4.5. Advantages of the Scheduler Method

The scheduler method as described satisfies both secrecy-level and secrecy-category constraints. It is likely to outperform a fixed-slot scheduler because it uses secrecy-class information to order the time slots and to determine when and how leftover CPU time can be reassigned.

It will be noted that, when leftover time remains in a current time slot, the selection of the next process to run is advantageously based solely upon the lattice structure of dominance relationships and is independent of the processes' runnability. So for example, when a run queue A's time slot starts, the CPU is first assigned to a process queued in run queue A. If no process in run queue A is runnable, then another process can be sought using the method just described.

This is advantageous when a choice exists among several processes whose secrecy levels directly dominate that of the current process. Graphically, this corresponds to points in the lattice where branches exist. A hypothetical example as shown in FIG. 2 might be TOP SECRET NATO and TOP SECRET NUCLEAR, both of which directly dominate TOP SECRET. If runnability is an input, then a spy process could detect that another process is runnable by the fact that it (the spy process) was not selected for execution. This would create a covert channel which the other process can then exploit by altering its own runnability.

Furthermore, processes from each run queue can run for the time slot assigned to that run queue plus whatever opportunistic time can be picked up. In the example illustrated in FIG. 6, run queue B is guaranteed a fixed share of the CPU during its assigned time slot B; its processes can also run in any leftover time from time slot A. An advantageous consequence of this policy is that the scheduler does not need to assign a slot to each secrecy class's run queue. This increases the scheduler's flexibility and may make it easier to match CPU resources against the workload.

4.6. Some Variations on the Scheduling Method

This section describes various enhancements to the basic lattice scheduler. These enhancements are not necessarily mutually exclusive; it will be apparent that some can be applied in combination.

(a) Distinct Secrecy- and Scheduling Classes. A distinction may be made between a process's secrecy class and its scheduling class, so that the security policy at any given site can combine several secrecy classes into a single scheduling class for more efficiency. Fewer branches means fewer queues of processes, which in turn means greater queueing efficiency. A useful analogy is a bank that has three equally efficient tellers working at any given time: customers are processed more quickly if they wait in a single queue (served by all three tellers) than in three different queues (each served by only a single teller).

(b) Assigning Time Slots to Specific Processes. In the example described above, the scheduler method associates time slots with specific secrecy classes. It could readily be modified to associate time slots with specific processes. This might be a useful variation where only a few processes exist at the same secrecy class.

(c) Preemptive Backtracking Within Time Slot. In the example described above and illustrated in FIG. 5, suppose that all processes from run queue A give up the CPU before the end of time slot A, and that control is passed to one or more processes from run queues B and/or D to use up the remaining time in time slot A. Now suppose that, before the end of time slot A, a process in run queue A becomes runnable. The scheduler could be designed so that the running process from run queue B (or D) is preempted and control is returned to the newly-runnable process from run queue A. In such a situation, of course, covert-channel countermeasures would be appropriate, because secrecy class A does not dominate secrecy class B or D. Scheduling of CPU time could then be handled as described above; alternatively, if run queue A again surrendered the CPU while time was still left in time slot A, control could be returned to the run queue that had earlier been preempted by run queue A.

(d) Round-Robin Selection of Successor Processes. The example above selects a successor process at random when several eligible successor processes exist (i.e., when branch points exist in the lattice). Another approach might be to make the selection deterministically in a "round robin" fashion. Such an approach, for example, might always pick alternative 1 during the first scheduling cycle, alternative 2 during the next, and so forth, until all the alternatives have been exhausted.

(e) Biasing the Allocation of Time Slots. At some user installations, most users are supported by processes having comparatively low secrecy levels. Processes of higher secrecy levels are reserved for more sensitive work and are used less often. This usage pattern can be observed in traditional operating systems such as VAX/VMS processes, where privileged accounts tend to be used less frequently than normal user accounts.

The lattice scheduler can work well with such a usage pattern by allowing time slots assigned to low-secrecy processes to be more easily reassigned. In particular, leftover time in a slot assigned to a process of low secrecy is much more likely to be utilized than leftover time in a high-secrecy process. This occurs, of course, because more processes are likely to exist whose secrecy classes dominate that of a low-secrecy process. The converse applies for time slots assigned to high-secrecy processes. For example, leftover time in a SYSTEM_HIGH slot cannot be reassigned since by definition no process with a higher secrecy class exists.

Given this usage pattern, the scheduler could improve CPU utilization by assigning more (or larger) time slots to low-secrecy processes and fewer (or smaller) time slots to high-secrecy processes. In highly unbalanced loads, the scheduler could even assign time slots only to low-secrecy processes and assign none to high-secrecy processes. High-secrecy processes would then run only when low-secrecy processes wait or otherwise voluntarily yield the CPU.

(f) Dynamic Biasing of Time-Quanta Allocation. Biasing the assignment of quanta towards low-secrecy processes may not be optimal under all conditions. For example, at any given time a computer system may be servicing a comparatively large number of high-secrecy processes and comparatively few low-secrecy processes. To take this into account, the time slots assigned to each process may be dynamically adjusted to reflect the current workload of the computer system. Several known scheduling algorithms exist to do this; an appropriate algorithm can be selected based on the details of the specific installation, the workload, and so forth.

Of course, care must be taken to ensure that such a time-slot adjustment process is itself not exploited as a covert channel. The adjustment must therefore be done infrequently or randomly enough so that the effective bandwidth of the channel is constrained. An adjustment every ten seconds should be entirely adequate in many implementations.

4.7. Multiprocessor Adaptations

The scheduler disclosed herein can be adapted in several different ways to a multiprocessor computer system (e.g., one having multiple CPUs running essentially simultaneously). In both the cases described below, conventional techniques for multiprocessor synchronization and mutual exclusion must be used. For example, shared variables and data structures (such as the scheduling lattice, the process table, and possibly the time slot ring) must be accessed under appropriate locks. Different CPUs will also need to maintain their own respective states (e.g., each CPU must track its own copy of the current_time_slot variable).

(a) All CPUs Running In Same Secrecy Class. In a first approach, all CPUs are constrained to run processes in the same secrecy class. When a time slot starts, all the CPUs look for runnable processes at the new secrecy class.

When a current run queue is exhausted (i.e., when no runnable process is left in the queue for an available CPU to run), no CPU is permitted to go "up" the lattice unless all other CPUs have also run out of available processes to run at the current time slot. This can be a less than optimal approach in terms of performance, but it does help eliminate certain inter-CPU covert channels. Exception: CPUs are not bound by this constraint to run system processes, i.e., a free CPU can always run system processes even if some CPUs are still running "lower" secrecy-class processes (because as noted above, system processes are assumed not to affect the security properties of the computer system).

(b) CPUs Running in Different Secrecy Classes. Another approach involves permitting CPUs to run processes in different secrecy classes. Several time slot rings are created as discussed above; one time slot ring is assigned to each CPU. Each CPU then independently executes the scheduling method described above. (An alternative implementation of this approach is to allow the CPUs to contend for available time slots when their respective current time slots end.) If CPUs outnumber time slots, then more than one CPU can be assigned to time slots in which more than one process is queued. The net effect is that each CPU may run processes belonging to different secrecy classes. This permits more efficient use of CPU time, but it also gives rise to the potential of certain types of covert channels. Various algorithms for assigning time slots to CPUs and constructing time slots can be selected based upon the characteristics of the processes. Depending upon the workload, the time slot adjuster process can also shift a time slot from one CPU to another.

5. CONCLUSION

While the invention is susceptible to various modifications and alternative forms, specific embodiments thereof have been shown and described by way of example. Different variations are plainly possible.

For example, functions described above as performed by a programmed machine could alternatively (and equivalently) be performed by suitable discrete-logic circuitry, built out of individual components or in one or more integrated circuits, in a manner that is routine to those of ordinary skill having the benefit of this disclosure. The reverse is also true, of course, namely that functions performed by hardware can alternatively (and equivalently) be performed by programmable general-purpose circuitry that has been suitably programmed, again in a routine manner.

The invention is not intended to be limited to known computer systems; on the contrary, it encompasses similar subject matter implemented in future systems that may be developed (e.g., computers based in part on optical or organic components as opposed to purely electronic components).

It should likewise be understood that the invention is not limited to the particular forms disclosed, but on the contrary, the invention is to cover all modifications, equivalents, and alternatives falling within the spirit and scope of the invention as defined by the appended claims.

APPENDIX 1

{ ********************* SAMPLE DATA STRUCTURES ************** }

```
1    module sched_defs;
2
3    {
4    MODULE DESCRIPTION:    Data structure declarations for lattice scheduler.
5
6    This file contains declarations for 3 major data structures:
7
8        process table = stores data about each process.
9
10       scheduling lattice = encodes the security properties of the processes.  This lattice contains scheduling
11           nodes that encode information about which processes dominate each process.  Each node also
12           contains a run queue of processes at that secrecy class.
13
14       The scheduler uses the scheduling lattice to determine the next process to run in the remainder of
15           the current time slot.
16
17       time slot ring = used by the clock interrupt service routine to determine which process owns each time
18           slot.
19
20       }
21
22   CONST
23       max_processes = 100;              { max number of processes }
24       max_successors = max_processes - 1; {  max number of processes which can directly dominate a process.
25                                         }
26
27   TYPE { dummy type declarations }
28       access_class_type = integer;
29       sched_statistics_type = integer;
30       process_state_type = integer;    {    Implementation-dependent, e.g., pre-process state information}
31
32
33
34   { *********** Pointer to process descriptor ******************}
35
36   process_table_entry_ptr = ^process_table_entry;
37
38
39
40   { ************ process queue header ************************ }
41
42   queue_type = record
43
44       flink, blink: process_table_entry_ptr;
45       end; { queue type }
```

```
46
47     { ************ Type declaration for a scheduling node. Each node contains a run queue of processes at
48         a given secrecy class. One scheduling node exists for each secrecy class that has a process. The entire
49         scheduling lattice is constructed from these nodes. ********}
50
51     Scheduling_Node_ptr = ^Scheduling_Node_type;
52     Scheduling_Node_type = RECORD
53
54         access_class: access_class_type;
55         {   secrecy class of processes in this scheduling node. }
56
57         queue_not_empty: boolean;
58         {   Flag indicating that runnable processes are queued at this secrecy class. This flag is for fast trav-
59             ersal through the lattice when we wish to find the next runnable process. }
60
61      process_count: integer;
62         {   number of processes at this secrecy class. }
63
64      runnable_queue: queue_type;
65         {   queue of runnable processes at this secrecy class. }
66
67      { Following array contains pointer to every node which directly dominates the current node. Array is used
68          instead of more traditional linked list to permit indexing within it. Branch is selected by generating a
69          random number in the range 1 . . . num_successors, which is used as an index within successor_array
70          to fetch address of next scheduling node. }
71
72      successors: RECORD
73
74          num_successors: 0..max_processes; {0..max_processes-1; }
75          { number of successors. 0 if node is system_high, i.e., no successors. }
76
77          { Following array contains an entry for each scheduling node that directly dominates the current node.
78              Number of entries is specified by num_successors. If the language supports dynamic arrays, bounds
79              would be 0..num_successors. }
80
81          successor_array: ARRAY [1..max_successors {num_successors}] OF Scheduling_Node_ptr;
82          END; { successors }
83
84      {   Implementation-dependent stuff, e.g., counters to track resource usage}
85              sched_statistics:   sched_statistics_type;
86
87
88      END; { Scheduling Node type }
```

```
 89
 90    { ********* Process table entry describes state of a single process. ****}
 91
 92    process_table_entry = RECORD
 93
 94       flink, blink: process_table_entry_ptr;
 95
 96       { forward & backward links used to queue this process (e.g., in scheduling_node.runnable_queue. In the
 97         special case where there is only one process at each secrecy class, the process_table_entry itself can be
 98         stored here. }
 99
100       Scheduling_Node: Scheduling_Node_ptr;
101         { the scheduling node to which this process belongs. }
102
103       access_class: access_class_type;    { secrecy class of this process. }
104
105       process_state: process_state_type;  { Implementation-dependent, e.g., pre-process state information}
106
107       END; { process_table_entry }
108
109
110    { ************* Time slot entry. Used to form the time slot ring. *******}
111
112    Time_slot_entry_ptr_type = ^Time_slot_entry_type;
113
114    Time_slot_entry_type = RECORD
115
116       flink, blink:    Time_slot_entry_ptr_type;
117                        {   pointers to previous and next time slots. }
118
119       access_class:    access_class_type;
120                        {   access class of the scheduling node which 'owns' this time slot. }
121
122       last_access_class: access_class_type;
123                        {   highest access class of user process to execute in this time slot.  This field is
124                            initialized to the access class of this time slot. }
125
126       sched_node_ptr:  Scheduling_Node_ptr;
127                        {   pointer to the scheduling node at this secrecy class. }
128
129       quantum_given,
130       quantum_left:    integer;
131
132       END; {Time_slot_entry_type}
133
134
135
136
```

```
137
138        { ********* The scheduling lattice.  scheduling_lattice points to the scheduling node of the system_low
139            process in the system. *********}
140
141    VAR
142        scheduling_lattice : [external] Scheduling_Node_ptr;
143
144
145
146
147
148        { ********* The process table.  Contains an entry for the maximum number of processes in system.
149            *********}
150
151        process_table : [external] ARRAY [1..max_processes]
152                OF   process_table_entry;
153
154
155
156
157        { ************ Global time slot ring used by clock interrupt service routines to determine the process to run
158            during next time slot.  This is a ring since the last entry points to the first entry. ********}
159
160    time_slot_ring:     [external] Time_slot_entry_ptr_type;
161
162
163
164
165        { ********** Current time slot. **********}
166
167    current_time_slot:  [external] Time_slot_entry_ptr_type;
168
169    END.    {end of sched_defs}
170
171
```

APPENDIX 2

{ ***********************  EXEMPLAR PROGRAM ROUTINES *********** }

```
 1   [inherit ('sched_defs')]  {    Use previously defined data structures  }
 2
 3   module prog;
 4
 5   {   PROGRAM DESCRIPTION:    Skeletal routines to illustrate how lattice scheduling works. }
 6
 7
 8   { external procedure declarations }
 9
10
11          { returns a pointer to the next unused process table entry. }
12   function next_free_process_table_entry: process_table_entry_ptr; external;
13
14
15
16          { initialize a new scheduling node at specified secrecy class. }
17   procedure initialize_sched_node (s: scheduling_node_ptr; access_class: access_class_type); external;
18
19
20
21          {    insert scheduling node s into scheduling lattice and rebuild the lattice. }
22   procedure rebuild_scheduling_lattice (VAR sched_lattice: scheduling_node_ptr; s: scheduling_node_ptr); external;
23
24
25
26
27          {    search the scheduling lattice and locate the schedulingnode at specified secrecy class.  If there
28               is no node with the specified secrecy class, NIL is returned. }
29   function find_sched_node_at_access_class (access_class:access_class_type): scheduling_node_ptr; external;
30
31
32
33
34          {   remove the first entry in the run queue. }
35   function remove_queue_head
36      (VAR queue: queue_type; VAR queue_empty: boolean): process_table_entry_ptr; external;
37
38
39
40
41          { random number generator }
42   function random (max: integer): integer; external;
43
44
45
46
```

```
              { see if a.secrecy dominates b.secrecy }
    function secrecy_dominates (a, b: access_class_type): boolean; external;

{    procedure which invokes all required covert channel countermeasures.  This can include, for
                   example, clearing the cache. }
    procedure covert_channel_countermeasures; external;

{    see if this is a system process }
    function is_system_process (np: process_table_entry_ptr): boolean; external;

{    context switch from current process into a new process }
    procedure context_switch (VAR old, new: process_table_entry_ptr); external;

{    Create a new process.
              If the secrecy class of the process is already in the scheduling lattice, just increment the count of the
                   number of processes at that secrecy class.
              If this is a new secrecy class, then create a scheduling node and insert it into the lattice.  We will
                   need to update the successor records as required. }
    FUNCTION create_process (access_class: access_class_type):
    process_table_entry_ptr;

VAR
          p : process_table_entry_ptr;
          s : Scheduling_Node_ptr;

BEGIN

{ find a free entry in the process table } p := next_free_process_table_entry;

p^.access_class := access_class;

s := find_sched_node_at_access_class (access_class);

if s = NIL   { i.e., there is no node at access_class } then begin
```

```
 97
 98                    new (s);    { allocate a new scheduling node. }
 99
100                    initialize_sched_node (s, access_class);
101                    s^.process_count := 1;
102                              {    insert s into scheduling lattice, update successors records. }
103                    rebuild_scheduling_lattice (scheduling_lattice, s);
104                    end
105
106              else begin
107                    s^.process_count := s^.process_count + 1;
108                    end;
109
110           p^.Scheduling_node := s;
111
112           create_process := p;
113        END;  {end of create_process}
114
115
116
117
118        {    Delete a process. When a process is deleted, we must remove the node from the scheduling lattice
119              if it is the only process at that secrecy class.
120        }
121        PROCEDURE delete_process (p: process_table_entry_ptr);
122
123           VAR
124              s : Scheduling_Node_ptr;
125
126           BEGIN
127
128              s := p^.scheduling_node;
129              s^.process_count := s^.process_count - 1;
130
131              if s^.process_count = 0 then begin
132                    { p was the only process at this secrecy class }
133
134                    { Action to take:  Delete the scheduling node s.  Remove s from the successor table of all
135                       scheduling nodes which it directly dominates.
136                    }
137
138                    end;    {end of delete scheduling node}
139        END; {end of delete_process}
140
141
142
143
144        {    Make a process runnable by inserting it into the runnable
145              queue at the scheduling node with the same secrecy class. }
146        PROCEDURE make_process_runnable (p: process_table_entry_ptr);
```

```
147
148        VAR
149            s : Scheduling_Node_ptr;
150
151        BEGIN
152            s := p^.scheduling_node;
153
154            { Action to take:  Insert p into s^.runnable_queue; }
155
156            s^.queue_not_empty := true;
157        END; { end of make_process_runnable }
158
159
160
161
162
163    {   Returns a new process to run.  This function is called when the current process gives up the CPU before
164        the end of the current time slot. }
165
166    FUNCTION get_next_process_to_run
167            (current_sched_node:scheduling_node_ptr):process_table_entry_ptr;
168
169        VAR
170            np : process_table_entry_ptr;
171            queue_now_empty : boolean;
172            successor_index : integer;
173        BEGIN
174                   {   If there are runnable processes at the current secrecy class, pick the next one from the
175                       queue. }
176            if current_sched_node^.queue_not_empty then
177              begin
178                  np := remove_queue_head (current_sched_node^.runnable_queue,
179                       queue_now_empty);
180                       {    if the queue is now empty, mark it so. }
181                  current_sched_node^.queue_not_empty := NOT queue_now_empty;
182              end
183
184                       { otherwise, pick a node which directly dominates the current node.  i.e., traverse the
185                         lattice towards system_high looking for the first runnable process. }
186            else begin
187
188                   {   Randomly pick a successor node.  random returns random number between 1 and n.
189                       Note that num_successors is guaranteed to be >= 0 since only the system_high null
190                       job has num_successors = 0 and it is always runnable. }
191                successor_index :=
192                       random (current_sched_node^.successors.num_successors);
193
194                current_sched_node := current_sched_node^.successors.
195                       successor_array [successor_index];
196
```

```
197                             {   Recursively check it. Note that this recursion is guaranteed to terminate since
198                                 the null job by definition is at system_high and it is by definition always
199                                 runnable. }
200             np := get_next_process_to_run (current_sched_node);
201             end;    {end of randomly pick successor node}
202
203             {   keep track of the highest access class of non-system process to execute during this time
204                 slot. We don't track system processes since they are assumed not to contain Trojan horses.
205             }
206             if NOT is_system_process (np) THEN current_time_slot^.last_access_class := np^.access_class;
207
208         get_next_process_to_run := np;
209         END; { end of get_next_process_to_run }
210
211
212
213
214     { Clock interrupt service routine.  It is invoked when a time slot starts.}
215
216     PROCEDURE clock_interrupt_service (p: process_table_entry_ptr);
217         VAR
218             new_p:       process_table_entry_ptr;
219             new_time_slot: Time_slot_entry_ptr_type;
220             s:           scheduling_node_ptr;
221         BEGIN
222
223             new_time_slot := current_time_slot^.flink;
224
225             s := new_time_slot^.sched_node_ptr;
226             new_p := get_next_process_to_run (s);
227
228             {   if the new process' access class dominates
229                     MAX (access class which 'owns' current time slot,
230                         highest access class of any non-system process to execute in the current time slot),
231
232                 then there is no problem with covert channels.  Otherwise,  perform any required covert channel
233                 countermeasures.
234
235                 Note that the MAX function is implicitly performed, because we initialize last_access_class to the
236                 access class which 'owns' the time slot. }
237
238             if NOT secrecy_dominates (new_p^.access_class, current_time_slot^.last_access_class)
239                 then covert_channel_countermeasures;
240
241             { stop running the current process and make it runnable. }
242             make_process_runnable (p);
243
244             { context switch to the new process. }
245             context_switch (p, new_p);
246
```

```
247                    { advance to the next time slot. }
248          current_time_slot := new_time_slot;
249
250          current_time_slot^.last_access_class := current_time_slot^.access_class;
251
252      END; { end of clock_interrupt_service }
253
254  END.
```

What is claimed is:

1. A machine executed method of sequentially allocating the availability of a computer system resource among a plurality of consumers to inhibit use of the resource as a covert communications channel, each said consumer having a respective class that is a member of plurality of classes organized according to a partial ordering scheme wherein a first class A is in a dominance relationship with a second class B, said method comprising the steps of:
 (a) defining a scheduling cycle comprising a plurality of sequentially ordered time slots, each said time slot having a respective beginning time and ending time;
 (b) assigning at least one said class (designated as class X) to a said time slot (designated as time slot X);
 (c) at the beginning of said time slot X, making said resource available for use by a class-X consumer in said class X (subject to termination of said availability at the ending time of said time slot X); and
 (d) if said class-X consumer, referred to as consumer $C_0$, gives up the resource prior to the ending time of said time slot X, then making said resource available for use by a plurality of consumers, referred to as consumers $C_1$ through $C_N$, where N may be any integer greater than 1, in one or more classes that dominate said class X (subject to termination of said availability at the ending time of said time slot X) in a sequence wherein the class of any consumer $C_i$, i being any integer from 1 to N, dominates the class of the immediately preceding consumer $C_{i-1}$ in said sequence such that consumers in classes not dominating class X are prevented from using said resource during the period after the consumer $C_0$ gives up the resource and before the end of time slot X unless a covert-channel counter-measure is performed, thereby inhibiting the use of the resource as a covert communications channel.

2. The method of claim 1, wherein each said class includes (i) a level that is a member of a set of levels ranked in ascending order and (ii) a set of zero or more categories.

3. The method of claim 2, wherein said first class A dominates said second class B if (1) the level of class A is equal to or greater than the level of class B and (2) the set of categories of class B is identical to or a subset of the set of categories of class A.

4. The method of claim 3, wherein said class A "directly dominates" said class B if (i) said class A dominates said class B, and (ii) no class A' exists such that class A dominates class A' and class A' dominates class B.

5. The method of claim 2, wherein each said class, level, and category is a secrecy class, secrecy level, and secrecy category, respectively.

6. The method of claim 1, wherein said resource comprises CPU time in a computer system.

7. The method of claim 1, wherein each said consumer is a process being executed by a computer system.

8. The method of claim 1, wherein a single said class is assigned to each said time slot.

9. The method of claim 1, wherein a plurality of classes are assigned to said time slot X.

10. The method of claim 1, wherein if said class-X consumer gives up the resource prior to the ending time of said time slot X, then:

(a) if a second consumer exists in said class X, then making said resource available for use by said second consumer (subject to termination of said availability at the ending time of said time slot X),
 (b) else making said resource available, until the end of said time slot X, to one or more consumers in respective classes that dominate said class X other than class X itself.

11. The method of claim 10, wherein in step (a), said second consumer is selected for running in accordance with a consumer-running selection method.

12. The method of claim 11, wherein said consumer-running selection method comprises a queueing selection method.

13. The method of claim 1, wherein if said resource is given up by a yielding consumer, said resource is made available for use by a consumer in a class that dominates the class of said yielding consumer as follows:

(a) if only a single class exists that (i) directly dominates the class of the yielding consumer, and (ii) is associated with one or more existing consumers, then making said resource available for use by a consumer in said single class;
 (b) else if a plurality of directly-dominating classes exist that (i) directly dominate the class of the yielding consumer and (ii) are associated with existing consumers, then making said resource available for use by a consumer in a selected one of said plurality of directly-dominating classes.

14. The method of claim 13, wherein said selected one of said plurality of directly-dominating classes is selected through the use of a selection method that approximates a random process.

15. The method of claim 13, wherein said said selected one of said plurality of directly-dominating classes is selected deterministically.

16. The method of claim 1, wherein said time slots are of uniform duration.

17. The method of claim 1, wherein said time slots are selectively assigned among said classes in accordance with said partial ordering scheme.

18. The method of claim 1, further comprising the step, performed at the ending time of said time slot X, of making said resource available for use by a process in a class Y assigned to a time slot Y whose beginning time is immediately subsequent to the ending time of time slot X.

19. The method of claim 1, further comprising the steps of:

(e) performing a covert channel countermeasure operation; and
 (f) making said resource available for use by a consumer ("subsequent consumer") whose class does not dominate the class of said class-X process.

20. A program storage device that is readable by the machine of a specified one of claims 1 through 19, said program storage device encoding a program of instructions including instructions for executing the machine executed method steps of said specified one of claims 1 through 19.

* * * * *